July 13, 1965 J. PETTERSEN 3,194,251
COLLAPSIBLE CAMPING TRAILERS
Filed Feb. 26, 1962 2 Sheets-Sheet 1

INVENTOR
JOHN PETTERSEN
BY
Fetherstonhaugh & Co.
ATTORNEYS

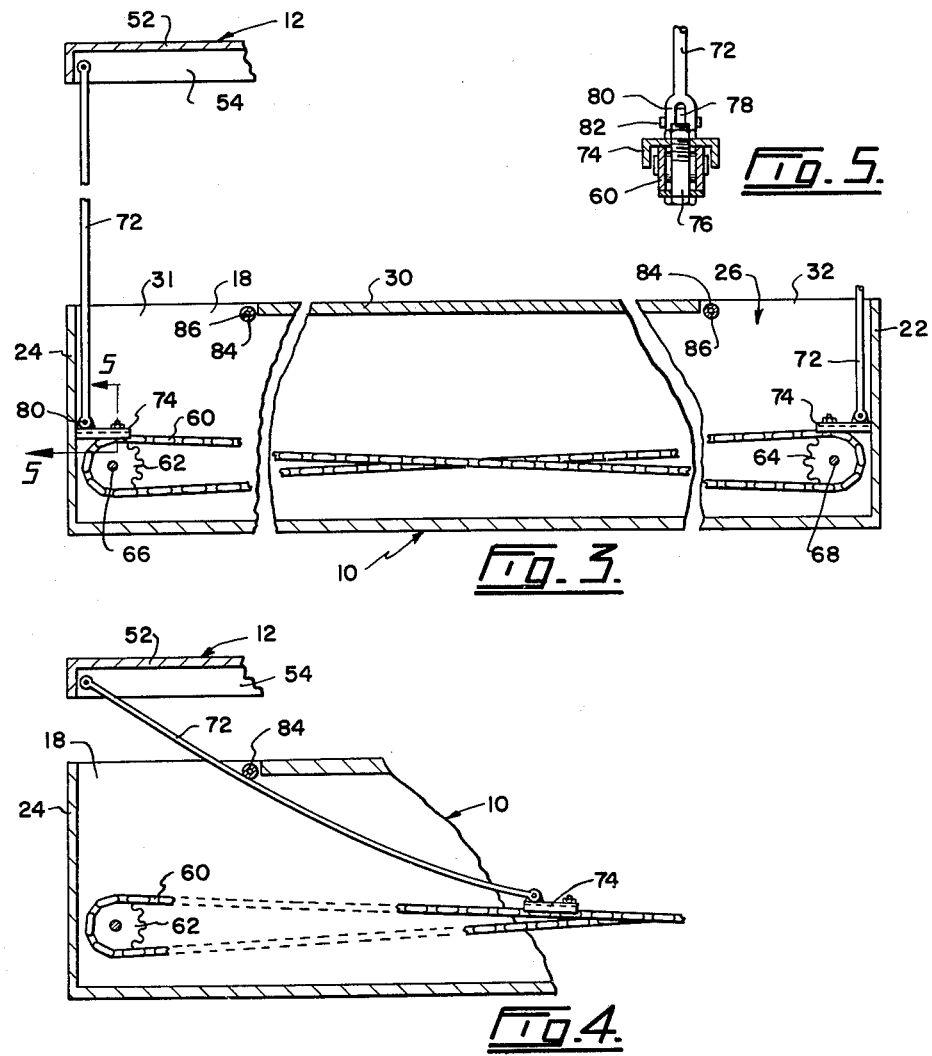

United States Patent Office 3,194,251
Patented July 13, 1965

3,194,251
COLLAPSIBLE CAMPING TRAILERS
John Pettersen, 12555 116th Ave., North Surrey,
British Columbia, Canada
Filed Feb. 26, 1962, Ser. No. 175,405
7 Claims. (Cl. 135—1)

This invention relates to trailers and in particular to collapsible camping trailers.

An object of the present invention is to provide a camping trailer which in its collapsed condition provides a compact unit for towing behind an automobile, and which when expanded provides a comfortable and capacious tent-like unit well adapted for normal living purposes.

Another object of the present invention is to provide a collapsible camping trailer having a canvas or similar pliant covering which is permanently secured at opposite ends to the body and roof structures of the trailer thereby minimizing the time and labor necessary to assemble or collapse the unit.

A further object of the present invention is to provide a collapsible camping trailer which is of light weight, and of simple and inexpensive construction, and which can be easily expanded or collapsed by one person or even by a child.

A still further object of the present invention is to provide a collapsible camping trailer wherein upon expansion of the trailer, the element normally forming the top closure of the trailer is elevated to a position above the body structure to provide a roof for the unit.

Yet another object of the present invention is to provide a collapsible camping trailer having a pliant sheet covering forming the walls of the unit when in its expanded position, said covering being adapted with the unit in its collapsed or folded condition to be accommodated within the trailer body.

A further object of the present invention is to provide a collapsible camping trailer in which the roof structure in the collapsed condition of the unit forms the top closure of the trailer and is adapted to be raised to its elevated roof forming position whereat it is so spaced from the trailer body as to provide sufficient headroom for persons standing within the unit.

In accordance with these objects, the invention contemplates the provision of a collapsible trailer unit comprising a body structure, a roof structure adapted in the collapsed condition of the unit to form a top closure for said body structure, a pliant covering secured at opposite ends to the body and roof structures, and means for raising and lowering said roof structure relative to the body structure, said covering in the extended position forming side and end walls for the trailer and being adapted in the collapsed position to be folded within the body structure.

In a preferred form of the invention the means for raising and lowering the roof structure comprises a plurality of rod members each secured at one end to the roof structure and at the other end to means for moving said end horizontally along a predetermined path. It is preferable to secure said other end of each rod member to one of a pair of endless chains extending along said body structure around sprockets mounted on the body structure. Means is provided for rotating the sprockets to move the chains and the rod members back and forth. Said members lie in a retracted substantially horizontal position when the roof structure is down, and the moving of the lower ends of the rod members raises said roof structure and lowers it again, depending upon the direction of movement of the members. Preferably, one of said rod members is associated with each corner of the roof structure, and a single control is provided for actuating both of said chains conjointly.

Other features which may be included in accordance with the invention will be described hereinafter and referred to in the appended claims.

In the accompanying drawings which illustrate embodiments of the invention,

FIGURE 3 is a sectional view taken on the line 3—3 of FIGURE 1 showing the operating mechanism for raising and lowering the roof structure and covering in its fully extended position, FIGURE 4 is a fragmentary view similar to FIGURE 3 showing the trailer in its partially extended position, and FIGURE 5 is a fragmentary sectional view taken on the line 5—5 of FIGURE 3.

Figure 1:
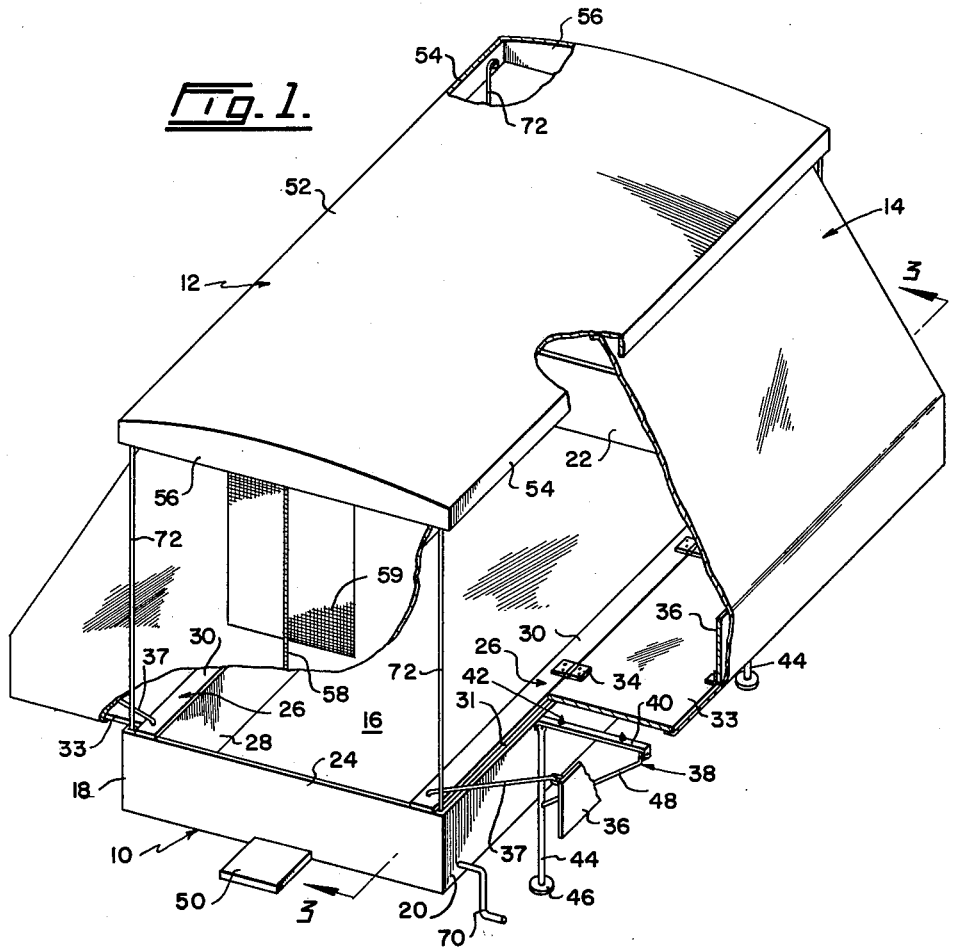
FIGURE 1 is a perspective view of a trailer according to the invention showing it in extended operative position and with the covering partly broken away to disclose the interior thereof.
Figure 2:
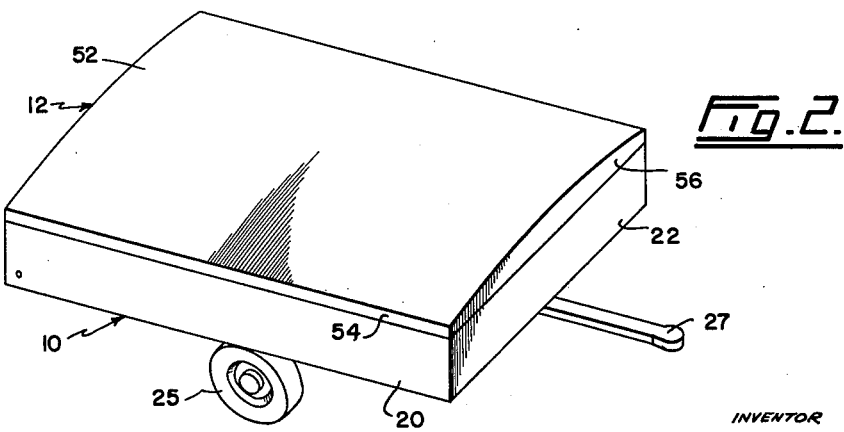
FIGURE 2 is a perspective view showing the trailer in its collapsed position.

Referring to the drawings, the trailer unit as best seen in FIGURES 1 and 2 essentially comprises a body structure generally designated 10, a roof structure designated 12 and a pliant covering 14 connected at opposite edges to the body structure 10 and roof structure 12.

The body structure 10 comprises an elongated box-like structure having a floor 16, outer side walls 18 and 20 and end walls 22 and 24. The body structure is mounted on road wheels 25 and is provided with a trailer hitch 27 for towing behind an automobile. A pair of identical compartments 26 extend longitudinally of the body structure from end wall 22 to end wall 24 at opposite sides of the body structure. Each compartment 26 is provided with an inner side wall 28 spaced inwardly from outer wall 18 or 20, and a cover member 30, said cover member being recessed adjacent the rear end wall 24 and the front end wall 22 of body structure 10 to form openings 31 and 32 extending inwardly of the body structure along side wall 18 or 20.

Longitudinally extending side flaps 33 are hingedly attached to cover members 30 as by hinges 34 and have upstanding side walls 36 hingedly secured thereto adjacent the outer longitudinal edges thereof. The walls 36 in the collapsed condition of the unit, are adapted to be folded inwardly on the side flaps 33 and the latter in turn are adapted to be folded inwardly of the body structure 10. In the expanded position of the unit, the side walls 36 are secured in their upstanding position by means of braces 37 secured to cover members 30 and the upper longitudinal edges of side walls 36. The flaps 33 are provided adjacent each end with support assemblies generally designated 38. Each support assembly 38 includes a bracket 40 secured to the underside of side flap 33 as by screws 42, a leg member 44 provided with a ground-engaging pad 46 pivotally secured to the inner end of bracket 40, and a brace 48 secured at one end to leg member 44 and pivotally connected at its other end to the outer end of bracket 40. In their collapsed position, the support assemblies 38 are adapted to be folded along the lower surfaces of side flaps 33, whilst in their extended position they form ground-engaging support for the side flaps 33. A suitable step member 50 is mounted in end wall 24 of body structure 10 for slidable movement within a slot therein and is adapted in its extended position to facilitate access to and from the trailer unit when the latter is in its extended position.

The roof structure 12 comprises a top 52 and peripheral side and end walls 54 and 56 respectively depending therefrom. The size and configuration of roof structure 12 is such that it forms a top closure or lid for the body structure when lowered into contact therewith in the collapsed condition of the trailer unit.

The body and roof structures are preferably fabricated from lightweight sheet metal such as aluminum, but may if desired be made of any other suitable material, such as plywood or plastic.

The pliant covering 14 is formed of canvas or any other suitable material, and may consist of one or more suitably shaped panels interconnected to form in the extended condition a hollow planar-faced tent-like structure provided with an end wall having an entrance 58 and a ventilation panel 59. The upper peripheral edge of the covering 14 is permanently or detachably secured to roof structure 12 adjacent the walls thereof and the lower peripheral edge of said covering is permanently or detachably secured to the lower longitudinal edges of the flap member 33 and to the front end wall 22 of body structure 10.

The roof structure 12 and associated covering 14 are raised and lowered relative to the body structure 10 by means of a lifting mechanism, best seen in FIGURES 3 to 5 of the drawings. The lifting mechanism includes a pair of endless chains 60 extending longitudinally of body structure 10 adjacent each side thereof, said chains being disposed within the compartments 26 and extending around sprockets 62 and 64 mounted on shafts 66 and 68 respectively, which latter extend transversely of body structure 10 and are journalled in the side walls thereof. Each chain 60 passes around its associated sprockets and crosses over medially thereof in a figure eight configuration. A suitable handle 70 is coupled to shaft 66 and extends through the side wall 20 of the body structure to provide a convenient means for rotating sprockets 62 and with them chains 60. The lifting mechanism also includes a plurality of rod members 72 which are preferably formed of a stiffly bendable material, such as spring steel or fibreglass. Each of the rod members 72 is pivotally connected at one end to the inner surface of the side peripheral walls of roof structure 12 adjacent a corner thereof. The other end of each of rod members 72 is pivotally connected to a bracket 74 fixedly mounted on that one of chains 60 disposed vertically therebelow. There are two rod members connected to each chain at points on said chain spaced apart a distance equal to half the length of said chain. The brackets 74 which are of generally inverted U-shaped form are secured to the chains by bolts 76 and are provided with upstanding lugs 78 to which the bifurcated ends 80 of rod members 72 are pivotally attached by means of pins 82. The rod members 72 extend through the openings 31 and 32 in the cover members 30 of compartments 26 and pass beneath rollers 84 rotatably mounted on pins 86 secured to the side walls of body structure 10.

With this arrangement, in the collapsed condition of the trailer unit, the rod members 72 are retracted within the compartments 26 in substantially horizontal positions, and the roof structure 12 fits snugly over the top of the body structure with the side flaps 33 and pliant covering 14 being folded inwardly and being housed within the trailer body. When it is desired to expand the trailer unit, it is merely necessary to turn handle 70 thereby to rotate sprockets 62 and 64 and chains 60. Movement of chains 60 is effective to move brackets 74 in opposite directions and, consequently, is effective to move rod members 72 upwardly through openings 31 and 32 beneath rollers 84, as shown in FIGURE 4. Continued rotation of handle 70 is effective to extend rod members 72 and, consequently, elevate roof structure 12 with attached covering 14 until the rod members assume a vertical position as seen in FIGURE 1, at which time the brackets 74 engage the end walls 22 and 24 of body structure 10 preventing further extension of the rod members. With the rod members 72 fully extended to their vertical position, the roof structure 12 is elevated to a position whereat head room is provided for persons standing in the expanded trailer unit. Thereafter, side flaps 33 are moved outwardly to a position whereat they extend from the sides of body structure 10, the side walls 36 are erected and braced by means of braces 37, and the support assemblies 38 are swung about their pivots into their supporting positions as shown in FIGURE 1. In this expanded position of the unit, the covering 14 is tensioned, and a capacious and airy tent-like enclosure is formed with ample room for beds and other desired furnishings or equipment. By referring to the left hand corner of body structure 10 in FIGURE 1, it will be seen that the adjacent rod member 72 is prevented from swinging longitudinally of the trailer by wall 24 and flap 33 when the latter is swung into its outer horizontal position. Each of the four rod members 72 is supported in this manner when roof structure 12 is up.

When the trailer is collapsed, rod members 72 in each compartment 26 have their lower ends positioned near the opposite ends of the body from the ones they are near when supporting the roof structure. As the chain is moved to raise the rod members, their respective ends are moved in opposite directions relative to each other so that one rod is actually working against the other, and this causes the roof structure to move upwardly rather than in the direction of movement of either rod member. The side walls of the compartment act as guides to keep the rod members moving in vertical planes and from swinging laterally, and coverings 14 act as side guys or braces.

As seen in FIGURE 4, rod member 72 is bent into a slight curve by roller 84 as roof structure 12 nears its lowermost position covering body structure 10. This keeps the rod member under tension during the first part of the raising and the last part of the lowering of the roof structure to stabilize the latter at these times. Furthermore, during the first part of the movement in raising the roof structure, the force applied to the lower end of the rod member by chain 60 is directed along said member and upwardly towards its opposite end so that the roof structure is lifted upwardly at this time.

It will be seen, therefore, that the present invention provides a collapsible camping trailer unit which may be expanded or collapsed in a very simple and expeditious manner without the use of tools, undue physical efforts or any special skills. This collapsible trailer unit when expanded provides a tent-like structure well adapted to accommodate beds and other furnishings and when collapsed is neatly housed within and completely protected against the weather by the trailer body.

What I claim as my invention is:

1. A collapsible camping trailer comprising a body structure having a confining wall formed of first and second pairs of opposed walls, a roof structure adapted in a collapsed condition of the trailer to form a top closure for the body structure, a pliant covering secured at opposite edges to the body and roof structures, two pairs of stiffly bendable rods pivotally connected at outer ends to the roof structure, each rod of each pair of rods when the roof structure is collapsed, extending along one wall of said first pair of opposed walls and being inclined downwardly from the roof structure and horizontally inwardly of the body structure, means connected to inner ends of the rods of each pair for simultaneously moving said inner ends horizontally towards and away from the second pair of opposed walls respectively to raise and lower the roof structure, the inner end of each rod when the roof structure is raised being positioned beside a wall of said second pair of opposed walls, a side flap hingedly connected to each wall of the first pair, each of said flaps when the roof structure is raised being swingable from a position within the body structure outwardly into a substantially horizontal plane and between the rods adjacent the wall to which said flap is connected, each flap having edges adjacent said last-mentioned rods to retain the latter in said positions beside said walls of the second pair, and pliable coverings connected to outer edges of the side flaps and the roof structure above said flaps, said coverings being foldable into the body structure when the flaps are moving into said body structure.

2. A collapsible camping trailer comprising a body structure having a confining wall formed of first and second pairs of opposed walls, a roof structure adapted in a collapsed condition of the trailer to form a top closure for the body structure, a pliant covering secured at opposite edges to the body and roof structures, two pairs of stiffly bendable rods pivotally connected at outer ends to the roof structure, each rod of each pair of rods when the roof structure is collapsed, extending along one wall of said first pair of opposed walls and being inclined downwardly from the roof structure and horizontally inwardly of the body structure, bearing means engaging each rod when the roof structure is collapsed to curve said rod downwardly longitudinally thereof, and means connected to inner ends of the rods of each pair for simultaneously moving said inner ends horizontally towards and away from the second pair of opposed walls respectively to raise and lower the roof structure, whereby because of the curve of the bendable rod the horizontal movement of the inner end thereof at this time results in substantially vertical movement of the outer end of the rod to raise the roof structure.

3. A trailer as claimed in claim 2 in which the moving means connected to the inner ends of each pair of rods comprises an endless chain extending along the adjacent wall of the first pair of walls around sprockets mounted on the body structure, means connecting the inner ends of said each pair of rods to the chain, and means connected to the sprockets by means of which the latter can be rotated to move the chain therearound.

4. A trailer as claimed in claim 2 in which when the roof structure is raised the inner end of each rod is positioned beside a wall of said second pair of opposed walls, and including a side flap hingedly connected to each wall of the first pair, each of said flaps when the roof structure is raised being swingable from a position within the body structure outwardly into a substantially horizontal plane and between the rods adjacent the wall to which said flap is connected, each flap having edges adjacent said last-mentioned rods to retain the latter in said positions beside said walls of the second pair, and pliable coverings connected to outer edges of the side flaps and the roof structure above said flaps, said coverings being foldable into the body structure when the flaps are moving into said body structure.

5. A collapsible camping trailer comprising a body structure having a confining wall formed of first and second pairs of opposed walls, an inner wall extending along and spaced inwardly from each wall of said first pair forming a compartment therebetween, a roof structure adapted in a collapsed condition of the trailer to form a top closure for the body structure, a pliant covering secured at opposite edges to the body and roof structures, a pair of stiffly bendable rods in each compartment and pivotally connected at outer ends to the roof structure, each rod of each pair of rods when the roof structure is collapsed extending along a compartment and being inclined downwardly from the roof structure and horizontally inwardly of the body structure, bearing means at each compartment spaced above the rod moving means and inwardly from a wall of the second pair, each of said bearing means being positioned to engage a rod when the roof structure is collapsed to curve said rod downwardly longitudinally thereof, and means in each compartment connected to inner ends of the pair of rods therein for simultaneously moving said inner ends horizontally towards and away from the second pair of opposed walls respectively to raise and lower the roof structure, whereby because of the curve of the bendable rod the horizontal movement of the inner end thereof at this time results in substantially vertical movement of the outer end of the rod to raise the roof structure.

6. A trailer as claimed in claim 5 in which when the roof structure is raised the inner end of each rod is positioned beside a wall of said second pair of opposed walls, and including a side flap hingedly connected to each wall of the first pair, each of said flaps when the roof structure is raised being swingable from a position within the body structure outwardly into a substantially horizontal plane and between the rods adjacent the wall to which said flap is connected, each flap having edges adjacent said last-mentioned rods to retain the latter in said positions beside said walls of the second pair, and pliable coverings connected to outer edges of the side flaps and the roof structure above said flaps, said coverings being foldable into the body structure when the flaps are moving into said body structure.

7. A trailer as claimed in claim 6 in which the moving means connected to the inner ends of each pair of rods comprises an endless chain extending along the adjacent wall of the first pair of walls around sprockets mounted on the body structure, means connecting the inner ends of said each pair of rods to the chain, and means connected to the sprockets by means of which the latter can be rotated to move the chain therearound.

References Cited by the Examiner
UNITED STATES PATENTS

| | | | |
|---|---|---|---|
| 1,505,386 | 8/24 | Golding et al. | 268—59 XR |
| 1,864,047 | 6/32 | Lawhorne. | |
| 1,946,164 | 2/34 | Houdashelt. | |
| 2,483,332 | 9/49 | Brumbaugh | 296—23 |
| 2,493,258 | 1/50 | Massare | 296—23 |
| 2,640,721 | 6/53 | Kors | 20—2 XR |
| 2,798,760 | 7/57 | Hille | 296—23 |

HARRISON R. MOSELEY, *Primary Examiner.*